United States Patent [19]

Kimura

[11] Patent Number: 4,497,048

[45] Date of Patent: Jan. 29, 1985

[54] TECHNIQUE FOR CONTROLLING TRACKING IN AN OPTICAL DISC APPARATUS

[75] Inventor: Kenji Kimura, Tachikawa, Japan

[73] Assignee: Olympus Optical Co. Ltd., Japan

[21] Appl. No.: 369,085

[22] Filed: Apr. 16, 1982

[30] Foreign Application Priority Data

Apr. 22, 1981 [JP] Japan .................................. 56-59662

[51] Int. Cl.³ .............................................. G11B 7/00
[52] U.S. Cl. ..................................................... 369/46
[58] Field of Search ..................... 369/44, 45, 46, 109, 369/110, 111; 250/201, 202, 206

[56] References Cited

U.S. PATENT DOCUMENTS

| | | | |
|---|---|---|---|
| 4,025,784 | 5/1977 | Lehureau | 369/45 X |
| 4,065,786 | 12/1977 | Stewart | 369/46 |
| 4,097,730 | 6/1980 | Korpel | 369/45 X |
| 4,123,652 | 10/1978 | Bouwhuis | 369/45 |
| 4,357,696 | 11/1982 | Bierhoff et al. | 250/201 |
| 4,375,088 | 2/1983 | de Haan et al. | 369/44 X |
| 4,408,314 | 10/1983 | Yokota | 369/46 |

FOREIGN PATENT DOCUMENTS

| | | | |
|---|---|---|---|
| 52-73702 | 6/1977 | Japan | 369/46 |
| 55-139642 | 10/1978 | Japan | 369/46 |

Primary Examiner—Donald McElheny, Jr.
Attorney, Agent, or Firm—Parkhurst & Oliff

[57] ABSTRACT

In a method for detecting a tracking error of a light spot with respect to a track recorded spirally or concentrically on an optical video or audio disc on which a light beam emitted from a laser light source is to be focused as a light spot by an objective lens, a light flux reflected by the disc is made incident upon a photo-detector having four light receiving regions divided in orthogonal directions to generate four output signals, two output signals from two pairs of diagonally arranged regions are summed to produce first and second sum signals, and a tracking error signal is derived by detecting a phase difference between the first and second sum signals. In order to detect the phase difference, the first and second sum signals are supplied to first and second band pass filters, respectively and first and second limiter circuits, respectively to produce first and second zero cross signals and a phase difference between the first and second zero cross signals is detected by a phase comparator. It is possible to effect the tracking control in a stable manner without being affected by amplitude variation of the first and second sum signals and by frequency modulated components included in the first and second sum signals.

5 Claims, 8 Drawing Figures

TECHNIQUE FOR CONTROLLING TRACKING IN AN OPTICAL DISC APPARATUS

BACKGROUND OF THE INVENTION

This invention relates to a method of effecting a tracking control in an optical disc picking-up apparatus.

Herefore, there have been proposed various kinds of the tracking control methods in the optical disc picking-up apparatus. Among them a two-dimensional pattern tracking method is well known. In this known method, a tracking error signal is derived from a reproduced signal modulated with pit information recorded on an optical disc, i.e. a reproduced RF signal obtained by photoelectrically converting a light flux reflected by or transmitted through an optical disc. This method has an advantage that the tracking control can be effected without using a particular tracking beam. FIG. 1 is a block diagram showing a principal construction of apparatus for effecting the two-dimensional pattern tracking method. In FIG. 1, a laser beam 1' emitted from a laser light source 1 and transmitted through a half mirror 2 is focused as a beam spot by an objective lens 3, and impinges upon a track having a pit construction recorded on a disc 4 along spiral or concentric tracks. The disc 4 is rotated at a constant speed by a motor M. A part of a light beam reflected by the disc 4 is collected by the objective lens 3 and is reflected by the half mirror 2, and then impinges upon an entrance surface of a photo-detector 5 so that the recorded information (pit information) is read out. As shown in FIG. 1, the entrance surface of the photo-detector 5 is divided into four regions 100-103 along orthogonal directions, one direction being in a disc radial direction and the other direction being perpendicular thereto. When a tracking condition is normal or correct, an incident light beam focused at a center of the photo-detector 5 has a circular shape. In FIG. 1, outputs of the regions 100 and 102 are supplied to an adder 8, and in the same manner, outputs of the regions 101 and 103 are supplied to an adder 9. Further, outputs of the adders 8 and 9 are supplied to a subtracter 10 and also to an adder 11. In this manner, a subtracted signal of diagonal regions is produced at an output of the subtractor 10 corresponding to the tracking condition, and at the same time an RF signal is obtained as a sum of light intensities of the four regions 100-103 from the adder 11. If a sampling pulse generator 14 is triggered by the RF signal, a peak value of the subtracted sinusoidal signal from the subtracter 10 is sampled and held by a sample and hold circuit 12 so as to obtain a tracking error signal.

FIG. 2 is a signal waveform showing a tracking information and a sampling pulse signal to obtain a tracking error signal. In FIG. 2, signals 17 show output waveforms pf the subtracter 10 under different tracking conditions, and in an in-focused condition an output signal is not produced at all as shown by a signal 17b. If the light beam deviates in an outer radial direction with respect to the track on the disc 4, an output signal 17a is generated as tracking error information. Contrary to this, if the light beam deviates in an inner radial direction with respect to the track, an output signal 17c is obtained as the tracking information. The output signals 17a and 17c have opposite phases. Therefore, it is possible to derive a tracking error signal by sampling and holding a peak point A of the waveforms 17 as shown in FIG. 2. A waveform 18 shows a waveform of the reproduced RF signal supplied from the adder 11. The RF signal 18 has a phase shifted by 90° with respect to the output waveforms of the subtracter 10. The sampling pulse generator 14 is triggered at a zero-cross point of the RF signal 18, and then sampling pulses 19 are generated from the sampling pulse generator 14 at a timing as shown in FIG. 2. A phase of the sampling pulse 19 is coincident with the peak point A of the waveform 17, so that it is possible to obtain the tracking error signal representing the tracking condition from the sample and hold circuit 12. The tracking error signal thus detected is amplified by a current amplifier 15 and then causes a moving coil 6 to move corresponding to the tracking error signal. The moving coil 6 moves the objective lens 3 in the radial direction with respect to the disc 4, so that a negative feedback loop is constructed to effect the tracking control. Moreover, the RF signal from the adder 11 is supplied to an output terminal 16 as an output information signal. However, in the known method mentioned above, since the disc 4 is rotated at the constant speed and thus, an optical spatial frequency of the disc 4 becomes high at an inner radial part of the disc so that the signal might be affected by a resolution of the optical system, a level of the picked-up RF signal becomes low as compared with that of the RF signal reproduced from an outer radial part of the disc. Therefore, a controlling gain for the tracking control is varied according to a radial position on the disc, and the level of the waveforms 17 shown in FIG. 2 fluctuates, so that the detected tracking error signal also fluctuates accordingly. Moreover, in this known method, since in case of using a video disc, the tracking information included in an FM modulated pit information must be separated, a frequency modulated component due to the pit information of the video signal might be introduced into the tracking information so that it is not possible to obtain a sufficiently good S/N ratio. This is due to the fact that the zero-cross point of the output 18 supplied from the adder 11 is modulated by side band components induced by the FM modulation, and then a phase of the sampling pulse 19 is modulated, so that the video signal component prevails in the tracking error signal to be obtained. Moreover, in the known method mentioned above, since the peak value of the RF signal is sampled, an amplitude modulated component due to the side band is liable to be introduced in the tracking error signal.

SUMMARY OF THE INVENTION

The present invention has for its object to eliminate the above-mentioned drawbacks and to provide a novel and useful method of controlling a tracking condition in a stable and accurate manner.

It is another object of the invention to provide a tracking control method in which a tracking error signal can be detected accurately without being influenced by amplitude variation of the reproduced signal.

It is still another object of the invention to provide a tracking control method in which a tracking error signal having a high S/N can be obtained without being affected by side band components which might be included in a reproduced RF signal due to frequency modulated components of pit information.

According to the invention, in a method of effecting a tracking control for correcting a tracking error of a beam spot projected onto a rotating optical disc in which information is recorded along spiral or concentric tracks consisting of pit construction so as to correct a deviation of the beam spot with respect to a track in a disc radial direction comprising, receiving a light beam modulated by the pit construction of the disc by a plurality of photoelectrically converting means to produce a plurality of reproduced signals representing a variation in a two-dimensional pattern of the light beam impinging upon the photoelectrically converting means in accordance with the tracking error, detecting a tracking error signal by processing said plurality of reproduced signals, and effecting the tracking control in accordance with the detected tracking error signal, the improvement comprises detecting a phase difference due to the tracking error between the plurality of reproduced signals to produce a phase difference signal; and deriving the tracking error signal from the phase difference signal thus produced.

DESCRIPTION OF THE PREFERRED EMBODIMENTS

Figure 3:
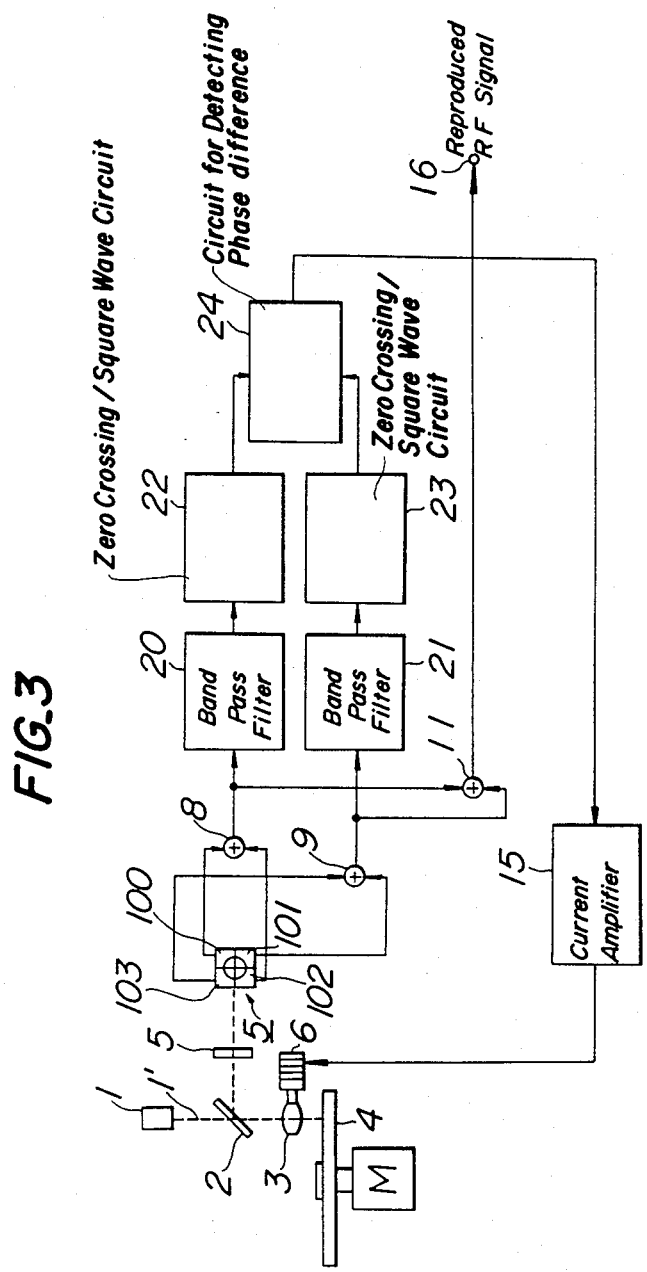
FIG. 3 is a block diagram illustrating one embodiment of an optical disc picking-up apparatus performing the tracking control method according to the invention.

FIG. 3 is a block diagram showing one embodiment of an optical disc picking-up apparatus performing the tracking control method according to the invention. In FIG. 3, a laser light 1' emitted from a laser light source 1 and transmitted through a half mirror 2 is focused as a beam spot by an objective lens 3 on an optical disc 4 rotated by a motor M. In the optical disc 4 there have been recorded spiral or concentric tracks consisting of a series of pits. A light beam reflected by the disc 4 is collected by the objective lens 3 and is further reflected by the half-mirror 2 toward a photo-detector 5 having four light receiving regions 100 to 103 divided in orthogonal directions. The output signals generated from the diagonally arranged regions 100 and 102 are supplied to a first adder 8 to produce a first sum signal and in the same way, the output signals from the regions 101 and 103 are supplied to a second adder 9 to generate a second sum signal. The first and second sum signals thus produced are further supplied to a third adder 11 to produce a reproduced RF signal. The construction so far explained is the same as that of the known apparatus shown in FIG. 1. According to the invention, the first and second sum signals i.e. reproduced frequency modulated pit information signals from the adders 8 and 9 are supplied to band pass filters 20 and 21, respectively to remove or at least reduce side band components of the reproduced frequency modulated pit information signals, and only fundamental frequency components are derived from the band pass filters 20 and 21, and are further supplied to square wave circuits (zero crossing detectors) 22 and 23, respectively. In the method according to the invention, the tracking information can be obtained by detecting a phase difference between the first and second sum signals as will be explained hereinafter so that it is not necessary to detect a level of the reproduced signal as is done in the known method. Therefore, zero cross points of the output signals passing through the band pass filters 20, 21 can be detected precisely by the circuits 22, 23, and only phase information of the output signals from the adders 8, 9 can be derived as the output signals of the circuits 22, 23. Both output signals of the circuits 22, 23 thus obtained are supplied to a circuit 24 for detecting phase so as to detect a tracking error voltage corresponding to a phase difference obtained by the circuit 24. Further, the tracking error voltage thus obtained is applied to a moving coil 6 after being amplified by a current amplifier 15 so as to effect the tracking control in the similar manner to that explained with reference to FIG. 1. Moreover, an output of the adder 11 may be derived as a reproduced RF signal at an output terminal 16.

Next, a manner of deriving the tracking error information by detecting the phase difference will be explained hereinbelow by using vector diagrams.

Figure 4:
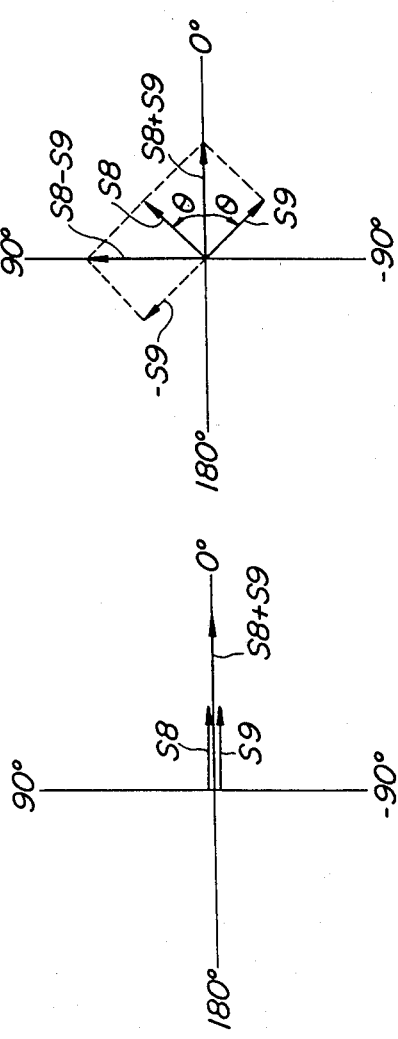
FIGS. 4A to 4C are schematic views depicting signal vector in various tracking conditions.

FIGS. 4A to 4C are vector diagrams showing a relation between the total sum signal supplied from the third adder 11 and a difference signal between the first and second sum signals supplied from the adders 8 and 9, respectively. The difference signal includes the tracking information and will be called as a diagonal difference signal. FIG. 4A illustrates the signals in an in-focused condition. In FIG. 4A, S8 and S9 show the output signals of the adders 8 and 9, respectively. In the in-focused condition, no phase difference occurs between the signals S8 and S9 and thus, the total sum signal (S8+S9) has the same phase as that of the signals S8 and S9. In this case, if the signals S8 and S9 have the same magnitude, the diagonal difference signal (S8−S9) is not generated at all. FIG. 4B shows a case in which the beam spot is deviated in an outer radial direction on the disc. In FIG. 4B, the signals S8 and S9 deviate in opposite directions by the same angle, symmetrically with respect to a 0° axis. That is to say, the phase of the signal S8 proceeds by $\theta$ and the phase of the signal S9 delays by $\theta$. The level of the total sum signal (S8+S9) is made low as compared with the in-focused condition, but the phase of the total sum signal does not deviate at all with respect to the 0° axis. In this case, the diagonal difference signal (S8−S9) is always generated on a 90° axis, and the amount of the diagonal difference signal (S8−S9) corresponds to an amount of the tracking deviation. FIG. 4C illustrates a case in which the tracking is deviated in an inner radial direction on the disc. In FIG. 4C, the phase of the signal S8 delays by $\theta''$, and the phase of the signal S9 proceeds by $\theta'$. Also in this case the amount of the total sum signal (S8+S9) becomes lower than that obtained in the in-focused condition, but it does not deviate with respect to the 0° axis. In this case, the diagonal difference signal (S8−S9) appears on a −90° axis, and the amount of the diagonal difference signal (S8−S9) corresponds to an amount of the tracking deviation. In the known method, the diagonal difference signal (S8−S9) generated on +90° or −90° axis is sampled to produce a tracking error voltage on the basis of the fact that the level of this signal (S8−S9) changes in accordance with the amount of the tracking deviation. Moreover, in this case, a sign or polarity of the signal (S8−S9) represents a direction of the tracking deviation. On the contrary, in the present invention, the tracking error is detected on the basis of the phase difference between the signals S8 and S9 as illustrated in FIG. 4. This phase difference is changed in accordance with the tracking condition in such a manner that no phase difference is occurred between the signals S8 and S9 in the in-focused condition, but if the beam spot deviates in the outer or inner radial direction on the disc, the signal S8 proceeds or delays by $2\theta$ or $2\theta'$ with respect to the signal S9. That is to say, the phase difference corresponds to the amount of the tracking deviation and thus, it is possible to obtain the tracking error signal by detecting the phase difference. In FIG. 4, since the phase shift may be varied from $+90°$ to $-90°$ and in the largest tracking deviation, the signals S8 and S9 appear on the $+90°$ and the $-90°$ axes, respectively and vice versa. Then, the total sum signal (S8+S9) becomes zero and the diagonal difference signal (S8-S9) is generated on the $+90°$ axis or $-90°$ axis and has the largest value.

Figure 5:
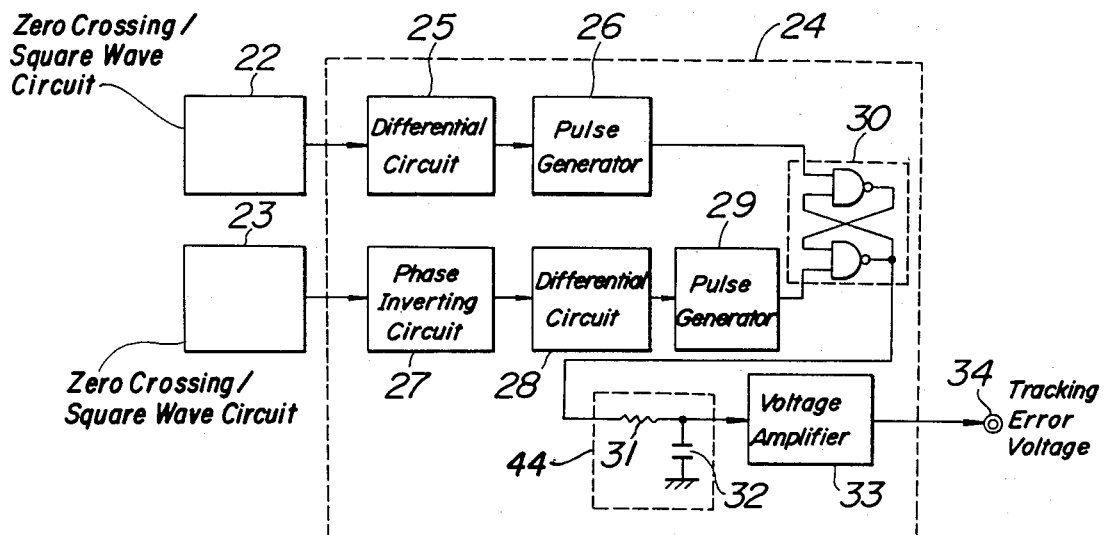
FIG. 5 is a block diagram showing one embodiment of a circuit for detecting phase in accordance withe the invention.

FIG. 5 is a block diagram showing one embodiment of the circuit 24 according to the invention. In FIG. 5, the output signal S8 of the circuit 22 is a square wave 35 (FIG. 6) which is differentiated by a differential circuit 25, and a pulse generator 26 is triggered by positive differentiated pulse to generate a negative pulse. Moreover, the output signal S9 of the circuit 23 is a square wave 38 (FIG. 6) which inverted by 180° by means of a phase inverting circuit 27 and then is differentiated by a differential circuit 28. A pulse generator 29 is triggered by positive differentiated pulse to generate a negative pulse. The negative pulses generated from both the pulse generators 26 and 29 are supplied to a reset and a preset terminals of an R-S flip-flop 30, respectively. As a result, a duty cycle of an output signal supplied from the R-S flip-flop 30 is varied corresponding to the phase difference between the signals S8 and S9. The output signal of the R-S flip-flop 30 is supplied to a low pass filter 44 consisting of a resistor 31 and a capacitor 32 to eliminate possible component of the signals S8 and S9 contained in the output signal, so that only the phase difference between the signals S8 and S9 can be detected as a voltage variation corresponding to the variation of the duty cycle. In this manner a tracking error voltage is obtained at an output terminal 34 after amplifying the output signal of the low pass filter by means of a voltage amplifier 33.

Figure 6:
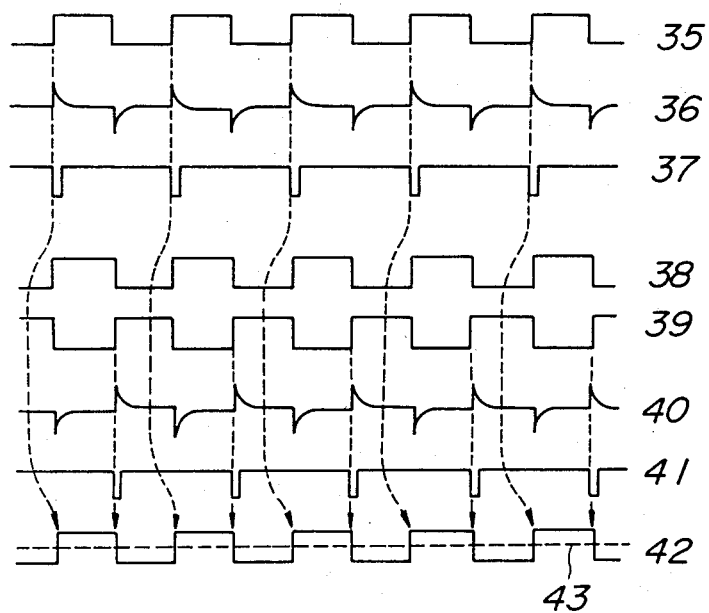
FIG. 6 is a signal waveform for explaining an operation of the phase comparator shown in FIG. 5.

FIG. 6 shows signal waveforms for explaining an operation of the circuit shown in FIG. 5. In FIG. 6, waveforms 35, 36, and 37 denote waveforms of the output signals of the circuit 22, the differential circuit 25, and the pulse generator 26, respectively. Also waveforms 38, 39, 40, and 41 represent the output signals of the circuit 23, the phase inverting circuit 27, the differential circuit 28, and the pulse generator 29, respectively. In the in-focused condition, the phase difference between the pulse 37 and the pulse 41 becomes about 180°. A waveform 42 shows the output signals of the R-S flip-flop 30. It is apparent that the duty cycle of the waveform 42 is varied according to the phase difference between the pulses 37 and 40. For instance, in the in-focused condition, the duty cycle of the output signal of the flip-flop 30 becomes 50% and thus, the output voltage of the low pass filter 35 represented by a waveform 43 becomes a middle value between the maximum and minimum values. When the tracking deviation occurs, the duty cycle of the output signal 42 becomes smaller or larger than 50% depending upon the direction of the deviation and the output signal 43 becomes smaller or larger than the middle value.

Figure 1:
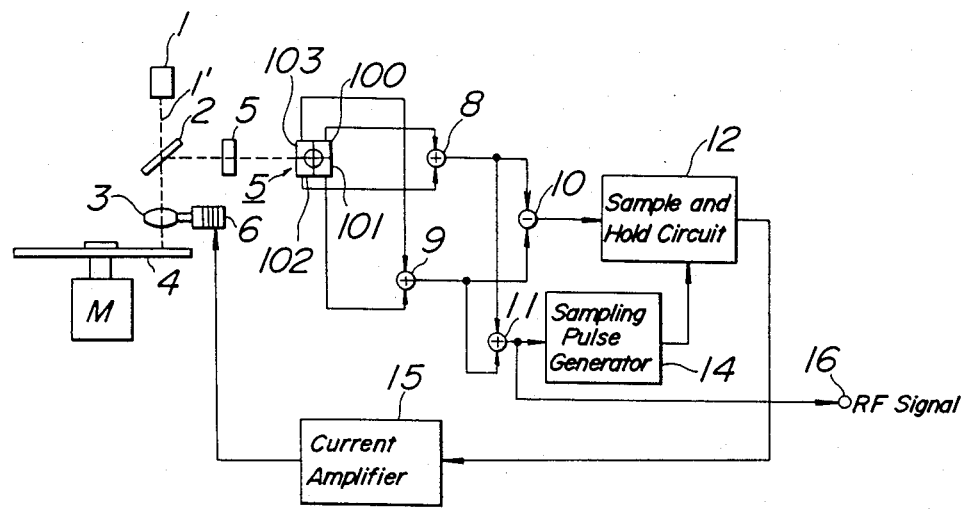
FIG. 1 is a block diagram showing an optical disc picking-up apparatus comprising a device for carrying out a known tracking control.
Figure 2:
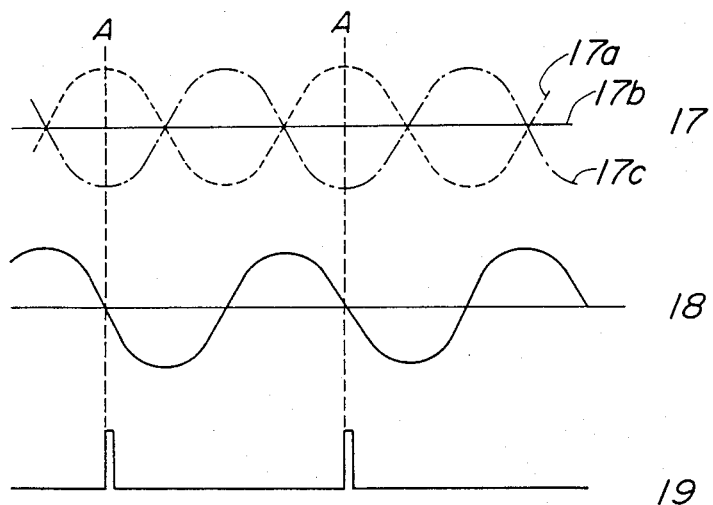
FIG. 2 is a signal waveform for explaining an operation of the tracking control device shown in FIG. 1.

As clearly understood from the above, in the known tracking method shown in FIG. 1, Since the level of the RF signal to be picked-up is varied in accordance with the scanning position on the disc and the tracking information interferes with the frequency modulated pit information component, the tracking error signal having a sufficiently high S/N and the stable tracking control can not be achieved. However, according to the invention, since the tracking information is derived from the phase difference between the signals S8 and S9 caused by the tracking error, it is possible to perform the tracking control in a stable and accurate manner without being affected by the level variations of the signals S8 and S9.

The present invention is not limited to the aforementioned embodiment, but various alternations and modifications may be possible. In the embodiment mentioned above, use is made of the reflection type optical disc picking-up apparatus, but it is possible to use the transmitting type one. Moreover, in the embodiment described above, the phase difference is detected by supplying the output signal generated from the photodetector to the circuit for detecting phase difference through the band pass filter and the zero crossing detector circuit, but it is possible to omit the band pass filter and the zero crossing detector circuit depending on the construction of the phase difference detecting circuit.

What is claimed is:

1. In a tracking control method for correcting the tracking error of a beam spot projecting upon a rotating optical disc having information recorded in the form of pits forming tracks, to correct deviation of the beam spot with respect to said tracks in a radial direction of said disc, wherein the method includes the steps of receiving a light beam modulated by the pits of said disc by a plurality of photoelectric detectors, producing a plurality of output signals representing a two-dimensional pattern of the light beam impinging upon said detectors in response to deviation of said beam spot from said tracks causing a tracking error, processing said signals to produce a tracking error signal, and correcting the tracking error of said beam spot in response to said tracking error signal, wherein the improvement in said receiving, producing and processing steps comprise:

receiving the light beam by four photodetector regions divided in mutually orthogonal directions, one direction extending in the radial direction of the disc and the other direction extending perpendicular to said one direction;

producing a first sum signal from the output signals of a first pair of said photodetector regions diagonally positioned with respect to one another and a second sum signal from the output signals of a second pair of said photodetector regions diagonally positioned with respect to one another;

processing said first and second sum signals to etect a phase difference between said first and second sum signals to produce a phase difference signal representing the direction and magnitude of the tracking error; and deriving said tracking error signal from said phase difference signal.

2. The method of claim 1 wherein said processing step includes passing said first and second sum signals through respective band pass filters to at least partially remove side band components of said first and second sum signals.

3. The method of claim 1 wherein said processing step includes producing a square wave signal representing said phase difference having a duty cycle which varies from an on track value of 50% in response to the tracking error.

4. The method of claim 3 wherein said step of producing a square wave includes:
   detecting zero crossings of said first and second sum signals to produce first and second zero cross signals, respectively;
   inverting the polarity of said second zero cross signal to produce an inverted second zero cross signal;
   differentiating said first and inverted second zero cross signals to produce first and second pulse signals, respectively; and
   setting and resetting an R-S flip flop with said respective first and second pulse signals to produce said square wave signal.

5. The method of claim 3 wherein said deriving step includes passing said square wave signal through a low pass filter to produce an output signal and applying the output signal from said low pass filter through an amplifier constructed to have an output which varies about a middle value.

* * * * *